July 27, 1926.

C. H. BISSELL 1,593,927

HEADLIGHT SWITCH AND BOX

Filed Dec. 13, 1922    2 Sheets-Sheet 1

INVENTOR.
Carl H. Bissell
BY Parsons & Brodell
ATTORNEYS.

July 27, 1926.

C. H. BISSELL 1,593,927

HEADLIGHT SWITCH AND BOX

Filed Dec. 13, 1922    2 Sheets-Sheet 2

INVENTOR.
Carl H. Bissell
BY Parsons & Bodell
ATTORNEYS.

Patented July 27, 1926.

1,593,927

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

REISSUED

HEADLIGHT SWITCH AND BOX.

Application filed December 13, 1922. Serial No. 606,759.

This invention has for its object a switch box, and switch so arranged that it is particularly compact and narrow or flat in arrangement and occupies a comparatively small place so that it projects but a small distance from the wall on which it is mounted. The switch is particularly designed for locomotive headlights and to be mounted in the cab of the locomotive along the window sill.

The invention consists in the novel features and in the combinations and constructions hereinafter set forth and claimed.

In describing this invention, reference is had to the accompanying drawings in which like characters designate corresponding parts in all the views.

Figure 1:
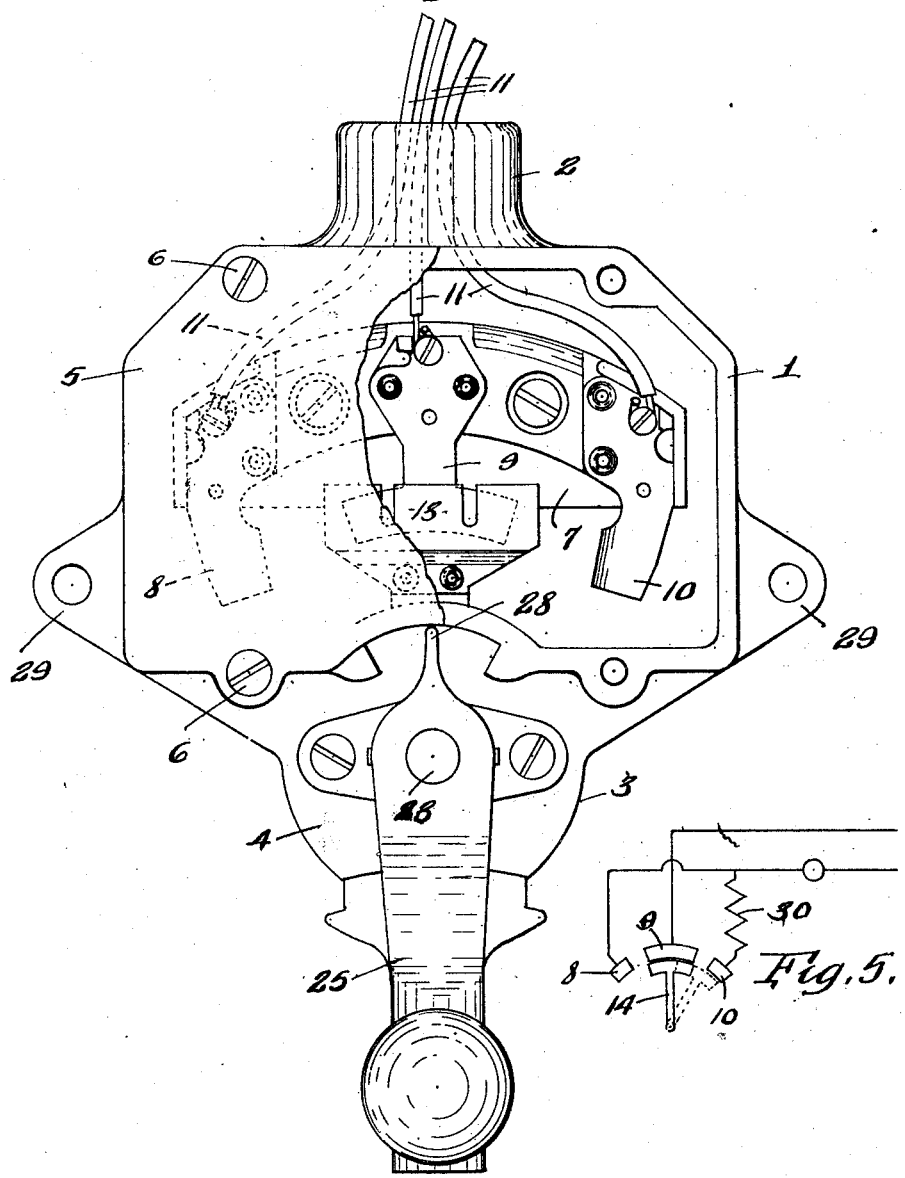
Figure 2:
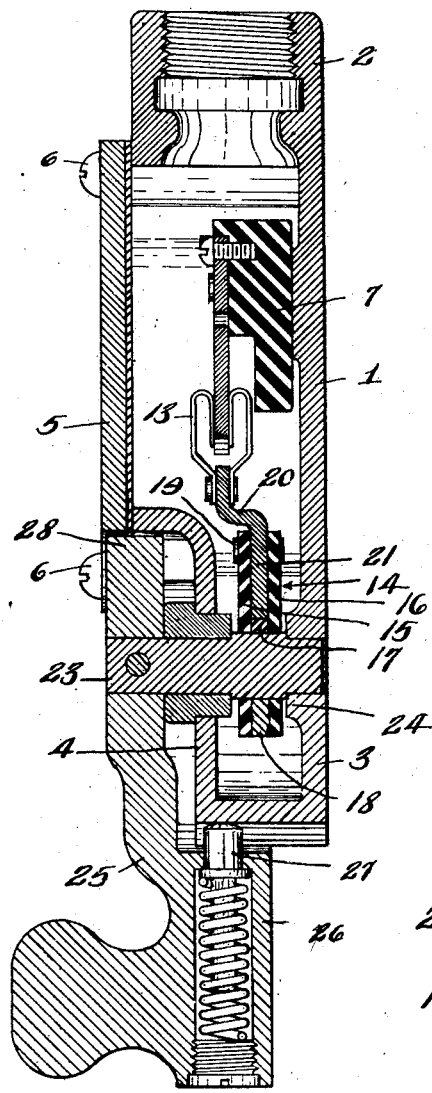

Figure 1 is a plan view, partly broken away of a preferable form of this switch.
Figure 2 is a longitudinal sectional view thereof taken centrally of Fig. 1.

Figure 4:
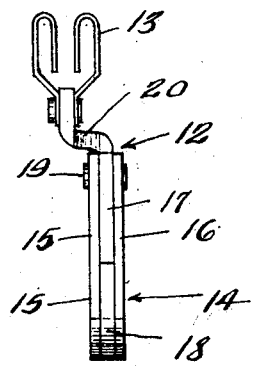
Figure 3:
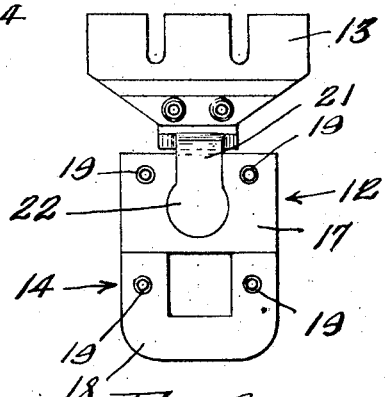

Figure 3 is a plan view of the switch arm.
Figure 4 is an edge view thereof.
Figure 5 is a diagrammatic view illustrating the electrical connection.

This switch comprises generally, a comparatively flat or shallow box, a switch mechanism in the box and operating mechanism located outside of the box and located between the planes of the inner and outer edges of the box, that is between the plane of the top and bottom wall of the box so that the whole construction is compact or flat whereby it does not project far from the wall on which it is mounted.

1 designates the box which is formed with a means as a nipple 2 at one end for connection to a conduit line enclosing the service wires, the box 1 having an extension 3 at its other end of less depth than the box, this extension having its top wall 4 arranged below the plane of the top wall of the box forming a depression for the switch operating lever.
In other words, the top wall 4 of the extension is of less distance from the bottom 3 than the top wall of the box is from the bottom and the bottom of the box and its extension are coextensive.
The upper side of the box is open and is normally covered by a closure 5 which is secured thereto in any suitable manner as by screws 6.

7 is a base or block for supporting terminals, this base being mounted in the box opposite the open side.

8, 9 and 10 are terminals mounted on the block 7 and connected to wires 11. 12 is a switch arm having a terminal 13 arranged to bridge either the terminals 8, 9 or 9, 10 and also having a shank 14 extending into the extension 3. This shank is composed of three layers, the upper and lower layers 15 and 16 being of insulation and the intermediate layer being of two parts, one part 17 which is located between like end portions of the layers 15 and 16 being of insulation and the other part 18 which is between the other end portions 16 of the layers 15, 16 being of metal. The layers are held together in any suitable manner as by rivets 19. The terminal 13 is supported by a metal arm 20 in the form of a gooseneck having a portion 21 extending between the layers 15 and 16 and being imbedded in the intermediate layer 17, such layer having a slot formed therein and an arm 22 fitting such slot.

The operating means comprises a pivot or shaft 23 extending through the extension and journaled in the bottom of the box in a bearing 24 in the top 4 of the extension, this shaft 23 fitting the non-circular alined holes in the layers 15, 16 and 18, the layer 18 which is of metal receiving the action or torque of the shaft and relieving the layers 15 and 16 from the strain of the operation of the switch arm.

25 is a lever mounted on the shaft 23 in the depression above the top wall 4 of the extension, the upper side of this lever being substantially flush with or below the plane of the top wall 5.

The lever 25 is also provided with a portion 26 extending in front of the portion 3 which portion 26 is provided with a spring pressed latch 27 coacting with the front wall 3.

The lever is also provided in front of the pivot 23, with an indicator 28 movable across the front face of the box proper, which points to the words "off" located in the center, "bright" located at the left of the center, and "dim" located at the right of the center.

The box is also provided with suitable means as laterally extending ears 29 by means of which it can be supported on the wall.

In operation, when the handle is swung to the left, Fig. 1, the terminal 13 connects the terminals 8, 9 and when swung to the right connects the terminals 9, 10.

A resistance 30 is located in the line of the terminals 9, 10 as shown in Fig. 5 so that the light is dimmed when the switch connects the terminals 9, 10.

This switch is particularly advantageous in that it is so constructed that it does not project from the wall to which it is attached and hence occupies a flat or compact space.

Owing to the construction of the switch arm, the insulation of such switch arm is relieved of the operating action.

What I claim is:—

1. An electric headlight switch comprising a comparatively shallow box having a passage for wires, the box having its top open and being formed with an extension having its top wall of less height from the bottom wall than the top edge of the box, a cover for the open side of the box, a switch mounted in the box including a terminal carrying block located in the box beneath the open top, a switch arm for coacting with the terminals and having a shank extending into the extension, a pivot on which the switch arm is mounted, said pivot journaled in the top of the extension, and an operating lever mounted on the outer end of the pivot and overlying the top face of the extension and extending beyond the end face of such extension, the outer face of the lever being substantially flush with the top of the box, substantially as and for the purpose set forth.

2. A switch comprising a box having an extension at one end of less depth than the box, the top wall of said extension being located at a less distance from the bottom than the top wall of the box whereby a depression is provided above the top of the extension and below the plane of the top of the box, a switch mounted in the box and including a movable switch arm extending into the extension, and an operating lever arranged in said depression and means connecting the lever to the switch arm, said means extending through the top wall of the extension, the operating lever being mounted to move in a plane substantially parallel to the top wall of the extension.

3. A switch arm comprising upper and lower layers of insulation, and an intermediate layer of insulation between like end portions of the former layers and a metal layer between the other end portions of the former layers, an arm imbedded in the first mentioned intermediate portion of insulation, the metal portion being formed with a non-circular opening and also the contiguous portions of the former layers being also formed with like openings, and a rotatable shaft for operating the switch arm extending through said openings and acting upon the metal layer, substantially as and for the purpose described.

In testimony whereof, I have hereunto signed my name, at Syracuse, in the county of Onondaga, and State of New York, this 21st day of November, 1922.

CARL H. BISSELL.